United States Patent
Kang et al.

(10) Patent No.: US 9,268,027 B2
(45) Date of Patent: Feb. 23, 2016

(54) METHOD AND SYSTEM FOR DETECTING SPECIAL NUCLEAR MATERIALS

(75) Inventors: Kejun Kang, Beijing (CN); Yigang Yang, Beijing (CN); Qitian Miao, Beijing (CN); Zhiqiang Chen, Beijing (CN); Yuanjing Li, Beijing (CN); Shangmin Sun, Beijing (CN); Hua Peng, Beijing (CN); Guang Yang, Beijing (CN); Bufu Liu, Beijing (CN)

(73) Assignees: Nuctech Company Ltd., Beijing (CN); Tsinghua University, Beijing (CN)

( * ) Notice: Subject to any disclaimer, the term of this patent is extended or adjusted under 35 U.S.C. 154(b) by 1047 days.

(21) Appl. No.: 12/991,982

(22) PCT Filed: May 7, 2009

(86) PCT No.: PCT/CN2009/000498
§ 371 (c)(1),
(2), (4) Date: Dec. 30, 2010

(87) PCT Pub. No.: WO2009/137985
PCT Pub. Date: Nov. 19, 2009

(65) Prior Publication Data
US 2011/0096886 A1    Apr. 28, 2011

(30) Foreign Application Priority Data
May 12, 2008   (CN) .......................... 2008 1 0106323

(51) Int. Cl.
*G01T 1/00*    (2006.01)
*G01V 5/00*    (2006.01)
*G01T 3/00*    (2006.01)

(52) U.S. Cl.
CPC ... *G01T 1/00* (2013.01); *G01T 3/00* (2013.01); *G01V 5/0091* (2013.01)

(58) Field of Classification Search
None
See application file for complete search history.

(56) References Cited

U.S. PATENT DOCUMENTS

| | | | |
|---|---|---|---|
| 4,497,768 A * | 2/1985 | Caldwell et al. | 376/153 |
| 5,420,905 A | 5/1995 | Bertozzi | |
| 5,838,759 A * | 11/1998 | Armistead | 378/57 |
| 7,277,521 B2 | 10/2007 | Norman et al. | |
| 7,359,480 B2 | 4/2008 | Slaughter et al. | |
| 2007/0096036 A1 | 5/2007 | Kang et al. | |
| 2009/0065713 A1 | 3/2009 | Zillmer et al. | |
| 2009/0175401 A1 * | 7/2009 | Bertozzi et al. | 376/154 |

FOREIGN PATENT DOCUMENTS

| | | |
|---|---|---|
| CN | 1196797 | 10/1998 |
| CN | 1959387 | 11/2005 |
| CN | 101340771 | 6/2008 |
| JP | 2114160 | 4/1990 |

OTHER PUBLICATIONS

X-Ray Mass Attenuation Coefficients, available at www.physics.nist.gov/PhysRefData/XrayMassCoef/chap2.html (last visited Nov. 7, 2013).*

* cited by examiner

*Primary Examiner* — Jack W Keith
*Assistant Examiner* — Sean P Burke
(74) *Attorney, Agent, or Firm* — Coats and Bennett PLLC

(57) ABSTRACT

A method and system for detecting special nuclear materials are disclosed. Said method and system detect the special nuclear materials by making use of the photofission characteristic and thermal neutron induced fission characteristic thereof. In one preferred embodiment, the high density and/or high atomic number region in the object to be detected is also detected first as a suspicious region.

19 Claims, 1 Drawing Sheet

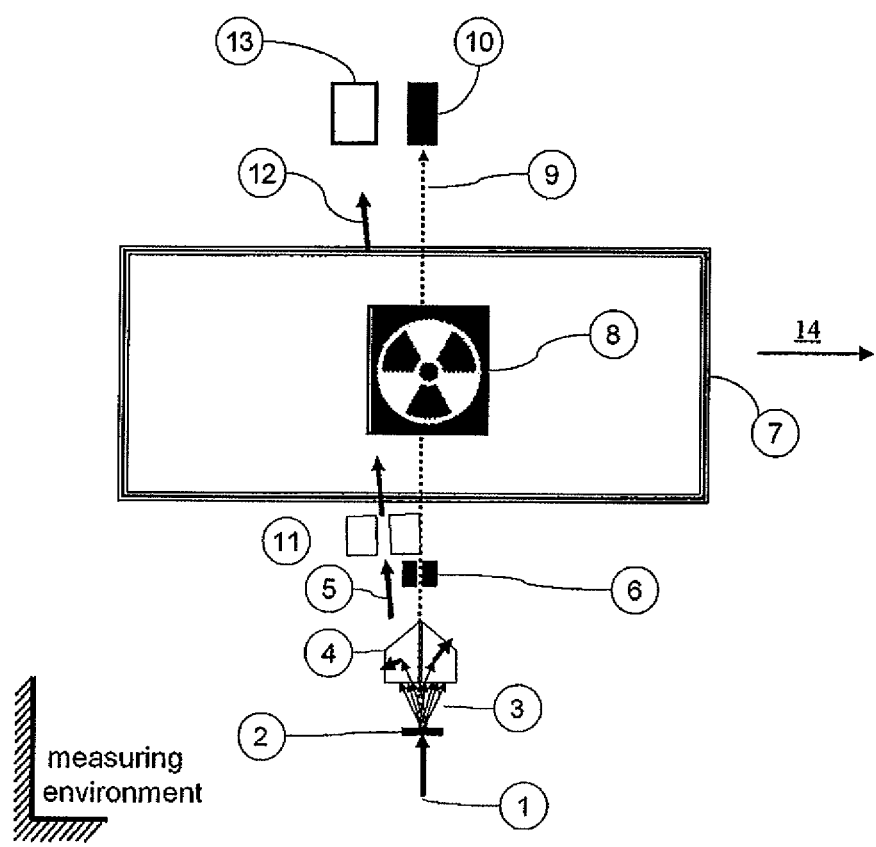

METHOD AND SYSTEM FOR DETECTING SPECIAL NUCLEAR MATERIALS

This application is a U.S. National Stage Application of PCT Application No. PCT/CN2009/000498, with an international filing date of 7 May 2009. Applicant claims priority based on Chinese Patent Application No. 200810106323.3 filed 12 May 2008. The subject matter of these applications is incorporated herein.

TECHNICAL FIELD

This invention concerns the field of dangerous article detection, and more particularly relates to method and system for detecting special nuclear materials.

BACKGROUND ART

The so-called special nuclear materials refer to uranium and plutonium that can be used for the manufacture of nuclear weapons. It is generally required that the abundance of the uranium 235 in uranium and the plutonium 239 in plutonium is at least 93%. Detection of special nuclear materials is detection of existence of uranium 235 and plutonium 239 concealed in an enclosed environment (for example a vehicle or container). Therefore, the special nuclear materials to be detected hereinafter refer to uranium 235 and plutonium 239.

It is known that several kilograms to tens of kilograms of the special nuclear materials are sufficient for constructing a simple nuclear bomb, thereby posing a great threat to social security. In some applications, the detection limit of special nuclear materials is defined as 100 $cm^3$, which is very small compared with the enclosed environment (for example a container) where special nuclear materials are possibly located. In addition, if the terrorists shield and camouflage the special nuclear materials to some extent, the detection difficulty thereof will be further increased. Therefore, how to detect these special nuclear materials that are not in "large quantity" from the goods imported via various ports raises great challenge to the detection technology.

Current detection technology for special nuclear material is usually classified as passive detection technology and active detection technology.

The passive detection technology makes use of the spontaneous disintegration phenomenon of the special nuclear materials. When the atomic nucleus of the special nuclear materials undergoes a spontaneous disintegration, it will release prompt neutrons and γ-ray signals. It is possible to find out the special nuclear materials by collecting/detecting these ray signals by using a detector.

However, the intensity of the signals emitted when the special nuclear materials disintegrates spontaneously is weaker. Therefore, the passive detection result is subject to the magnitude and shielding condition of the special nuclear materials and is very easy to be interfered by the shielding. If what measured by the detector is signal counting not energy distribution, it is impossible to differentiate the signal emitted from the special nuclear material from that comes from the radiation background of the nature (for example γ-ray of potassium 40 and neutrons produced by the cosmic rays). Therefore, the accuracy rate of detection is very low. Besides, the passive detection technology needs longer time to collect spontaneous disintegration signals and is not suitable for the occasion that needs higher detection speed, for example airport or harbour.

Nuclear resonance fluorescence technology is an active detection technology, which makes use of electromagnetic radiation of specific energy to irradiate the special nuclear materials. When the specific energy and the atomic nucleus of the special nuclear materials have the same energy level, strong absorption will occur. It is possible to carry out a complete definitive detection of the existence of the special nuclear materials by the detecting absorption condition of electromagnetic radiation of the specific energy or detecting the energy of γ photons emitted from the object after it absorbs electromagnetic radiation. This is a method having very good accuracy.

However, the nuclear resonance fluorescence technology needs to use a dedicated accelerator to produce monoenergetic, high-energy X-rays. In order to produce monoenergetic X-rays of the magnitude of MeV to irradiate the object to be detected, it needs an electron accelerator more than 100 MeV and high power laser source. At present, this kind of ray source is still in research phase and is not mature enough. Another ray source is to directly make use of braking radiation source, and then the requirement on the electron accelerator is not high. It only needs to accelerate the electrons to the magnitude of MeV to 10 MeV. However, the measurement of the nuclear resonance fluorescence photons at this moment is certainly accompanied with a lot background interference, which brings about great interference to the measurement and is adverse.

In a word, there appears no effective technology at present to detect special nuclear materials (in particular special nuclear materials concealed in an enclosed environment).

It is known that fissile materials, such as the special nuclear materials (namely uranium 235 and plutonium 239) and other nuclear materials (such as uranium 238 and plutonium 240) will undergo a photofission under irradiation of X-rays. Further, the special nuclear materials will undergo a thermal neutron induced fission under the irradiation of thermal neutrons.

Very obviously, it is impossible to determine the special nuclear materials only by using photofission because it will be interfered by other fissile materials such as uranium 238 and plutonium 240. The photofission process cannot differentiate uranium 235 from uranium 238, nor can differentiate plutonium 239 from plutonium 240.

It is conceived to detect special nuclear materials only by thermal neutron induced fission. However, the yield of the fission production produced by the thermal neutron induced fission is smaller, which reduces the sensitivity of detection of the special nuclear materials and is easy to result in false alarm. If thermal neutrons are used to irradiate the special nuclear materials for a long time to accumulate sufficient fission signals, it will result in excessive long detection time, which is adverse in the occasions (such as Customs and harbour) that have requirement on detection speed. Besides, the thermal neutrons are hard to be collimated to a narrow region. Therefore, even if special nuclear materials are found in the object to be detected, it is hard to determine the position thereof.

SUMMARY OF THE INVENTION

Therefore, the object of this invention is to provide a method and system for detecting special nuclear materials. Said method and system detect the special nuclear materials by making use of the photofission characteristic and the thermal neutron induced fission characteristic thereof. Such fission characteristics do not exist in other atomic nucleuses and thus can form features for detection of the special nuclear materials.

According to one aspect of this invention, it provides a method for detecting special nuclear materials, comprising:

irradiating a detection region of an object to be detected by using a first X-ray beam, the energy of the first X-ray beam being selected to enable the special nuclear materials that possibly exist in the object to be detected to undergo an observable light fission;

measuring a first fission ray signal emitted from the object to be detected due to the photofission, where if the measured first fission ray signal exceeds a first threshold value, it is determined that there exist fissile materials in the detection region of the objected to be detected;

irradiating the detection region of the object to be detected with low energy neutrons when existence of fissile materials is determined, the energy of the low energy neutrons being selected to enable the special nuclear materials that possibly exist in the fissile material in the object to be detected to undergo thermal neutron induced fission; and measuring a second fission ray signal emitted from the object to be detected due to the thermal neutron induced fission, where if the measured second fission ray signal exceeds a second threshold value, it is determined that the fissile materials in the object to be detected contain special nuclear materials.

According to the method of this invention, it is possible to determine whether the object to be detected contains fissile materials or not by using X-ray beam through the photofission process. Further, since the X-ray beam has good collimatablility, it is possible to precisely determine the position of the fissile materials in the object to be detected while determining the existence of the fissile materials, according to the method of this invention.

Since the process of detecting fissile materials by using photofission can be carried out more rapidly, and it does need the carry out the following thermal neutron induced fission process if no fissile materials are detected in the object to be detected, it is possible to greatly shorten the time used for the whole detection process. This very suitable for the occasion that has requirement on detection speed.

It is possible to carry out the following thermal neutron induced fission only after determining that fissile materials exist so as to determine whether special nuclear materials exist or not. Since the existence of the fissile materials is determined, it will not significantly increase the false alarm rate even if thermal neutrons are used to irradiate the object to be detected for shorter time. In this way, compared with the method of only using thermal neutron induced fission to detect special nuclear materials, the method of this invention can increase the detection speed and the detection accuracy rate.

In one preferred embodiment of this invention, the first fission ray signal may include a prompt fission ray signal and a delay fission ray signal emitted from the object to be detected due to photofission. In this way, it is possible to carry out double (repetitive) confirmations of the existence of the fissile material by detecting the prompt fission ray signal during the photofission process and detecting the delay fission ray signal after the photofission process so as to increase the accuracy of the detection.

In one preferred embodiment of this invention, the low energy neutrons may be photoneutrons produced by bombarding a photoneutron conversion target with a second X-ray beam. In this way, it is possible to use the same X-ray source (for example composed of an electron accelerator and an electronic target) to produce first and second X-ray beams so as to reduce the complexity and cost of the detection system.

In one preferred embodiment of this invention, the method further comprises detecting a suspicious region of the object to be detected prior to irradiating with the first X-ray beam and taking the suspicious region as a detection region. It is known that besides the aforesaid fission characteristic, the special nuclear materials further have the characteristics of high density and high atomic number, for example the atomic numbers of uranium and plutonium are respectively 92 and 94, and the densities thereof are respectively 18.95 g/cm$^3$ and 19.84 g/cm$^3$. These obviously exceed the atomic numbers and densities of other conventional articles. Therefore, it is possible to take the region having high density and/or high atomic number in the object to be detected as the suspicious region. In this way, it is possible to greatly reduce the fission detection range.

In detecting the suspicious region, it is possible to use an X-ray transmission detection and/or neutron transmission detection method. The X-ray beam and neutron beam used in the X-ray transmission detection and neutron transmission detection method can be the same as the X-ray source used in the photofission and thermal neutron induced fission processes carried out above. This further simplifies the complexity of the whole detection system.

BRIEF DESCRIPTION OF THE DRAWINGS

FIG. 1 is an exemplary embodiment of a system for detecting special nuclear materials of this invention.

MODES OF CARRYING OUT THE INVENTION

FIG. 1 shows a detection system according to a preferred embodiment of the present invention. As shown in FIG. 1, said system comprises an electron accelerator (not shown). Said electron accelerator can produce an electron beam 1. The electron accelerator can preferably emit an electron beam 1 of many kinds of energies (for example two kinds). An electronic target 2 is provided in the path of the electronic beam 1. In one embodiment, the electronic target 2 is preferably composed of tantalum metal. An X-ray beam 3 is produced when the electronic beam 1 bombards the electronic target 2.

The detection system in FIG. 1 further comprises a photoneutron conversion target 4, which is movable between a working position and a non-working position. The photoneutron conversion target 4 can be made of heavy water, beryllium or depleted uranium. The photoneutron conversion target 4 in FIG. 1 is in the working position. At this moment, the photoneutron conversion target 4 is in the travel path of the X-ray beam 3. In this way, the photoneutron conversion target 4 will produce photoneutrons 5 when the X-ray beam 3 bombards the photoneutron conversion target 4. The photoneutron conversion target 4 in FIG. 1 itself has a beam splitter, such that a part of the X-ray beam 3 directly passes through the photoneutron conversion target 4 without any action therewith. Specifically, the beam splitter comprises a path in the photoneutron conversion target 4 for the passage of a part of the X-ray beam 3. In this way, it is possible to produce X-rays and photoneutrons simultaneously by using the photoneutron conversion target 4. This part of X-ray beam 3 that directly passes through the photoneutron conversion target 4 is collimated into an X-ray beam 9 by an X-ray collimator 6.

Such kind of photoneutron conversion target 4 with a beam splitter as shown in FIG. 1 is recorded in the Chinese patent application No. 200810125197.6. Of course, it is possible to use other form of combination of a photoneutron conversion target and a beam splitter, such as the arrangement manner of the photoneutron conversion target and beam splitter as recorded in the Chinese patent application No. 200510086764.8. These two Chinese patent applications are cited herein for reference. Other independent photoneutron conversion target and beam splitter are also considerable.

The photoneutron conversion target 4 in FIG. 1 can also be in the non-working position (not shown). At this moment, the photoneutron conversion target 4 is out of the travel path of the X-ray beam 3. In this way, the X-ray beam 3 can directly irradiate the object 7 to be detected without production of any photoneutrons. It is possible to use a simple pivoting structure to realize shift of the photoneutron conversion target 4 between the working position and the non-working position. When the photoneutron conversion target is in the non-working position, the X-ray beam 3 from the electronic target 2 is collimated into an X-ray beam 9 by the X-ray collimator 6.

The detection system in FIG. 1 further comprises a photoneutron collimator 11 used for collimating the photoneutrons 5 produced into a photoneutron beam 12.

The collimated X-ray beam 9 and photoneutron beam 12 can enter the object 7 to be detected. The object 7 to be detected can be a vehicle or container, wherein it contains special nuclear materials 8 to be detected that possibly exist. Another side of the object to be detected is provided with mutually spaced X/γ ray detector 10 and neutron detector 13 used for detecting X/γ rays and neutrons emitted and/or transmitted from the object 7 to be detected during carrying out the detection process.

The method for detecting special nuclear materials of this invention is hereinafter further introduced with reference to FIG. 1.

1) Detecting a Suspicious Region in the Object to be Detected Having High Density and/or High Atomic Number The electron accelerator is adjusted such that it emits an electron beam 1 of third energy (referred to as third electron beam in the claims). The photoneutron conversion target 4 is moved to its working position. The electron beam 1 bombards the electronic target 2 to produce an X-ray beam 3 (referred to as third X-ray beam in the claims). It needs to note that the third X-ray beam 3 has a continuous energy spectrum.

A part of the X-ray beam 3 bombards the photoneutron conversion target 4, thereby producing photoneutron conversion target 5. It needs to note that the photoneutron beam 5 has a continuous energy spectrum. An X neutron collimator 11 collimates the produced photoneutron beam 5 into a photoneutron beam 12. Another part of the X-ray beam 3 passes through the path in the photoneutron conversion target 4 and forms into an X-ray beam 9 after collimated by the X-ray collimator 6.

The X-ray beam 9 is used to carry out X-ray transmission detection on the object 7 to be detected. Specifically, the X-ray beam 9 enters the object 7 to be detected and is disintegrated by substance including the special nuclear materials 8 that possibly exist. The X-rays transmitted from the object 7 to be detected enter the X/γ ray detector 10. The X/γ detector 10 detects the entering X-rays and forms corresponding electrical signals. The amplitude of the electrical signals reflects the disintegration information of the X-ray beam 9 in the object to be detected. The X/γ ray detector 10 can be composed of a one-dimensional detector array disposed in height direction of the object to be detected. Each measurement of the X/γ ray detector 10 can obtain a one-dimensional transmission data with respect to one cross section of the object to be detected. As the object 7 to be detected moves in the direction as shown by an arrow 14, the X-ray beam 9 scan the object 7 to be detected. In this way, it is possible to obtain a two-dimensional transmission data of disintegration of the object to be detected with respect to the X-rays. Alternatively, it is possible to form an X-ray transmission image of the object 7 to be detected by using the two-dimensional transmission data.

While carrying out X-ray transmission detection on the object 7 to be detected by using the X-ray beam 9, the photoneutron beam 12 is used to carry out the following neutron transmission detection on the object 7 to be detected. Specifically, the photoneutron beam 12 is projected into the object 7 to be detected and is disintegrated by the substance including the special nuclear materials 8 that possibly exist. The photoneutron beam 12 transmitted from the object 7 to be detected enters a neutron detector 13. The neutron detector 13 detects the entering neutrons and form corresponding electrical signals. The amplitude of the electrical signals reflects the disintegration signal of the photoneutron beam 12 in the object 7 to be detected. The neutron detector 13 can be composed of a one-dimensional detector array arranged in height direction of the object to be detected. Each measurement of the neutron detector 13 can obtain a one-dimensional transmission data with respect to one cross section of the object to be detected. As the object 7 to be detected moves along the direction as shown by the arrow 14, the photoneutron beam 12 scans the object 7 to be detected. In this way, it is possible to obtain two-dimensional transmission data of the disintegration of the object to be detected with respect to the neutrons. Alternatively, it is possible form neutron transmission image of the object 7 to be detected by using the two-dimensional transmission data.

According to the X-ray transmission data and neutron transmission data obtained above, it is possible to analyze the kind information of the materials in the object to be detected by conventional means, thereby determining the region having high atomic number therein. For example, in the Chinese patent application No. 200510086764.8, X-ray transmission data and neutron transmission data are used to form an n-x curve only associated with equivalent atomic number Z, and the curve is used to identify different materials within the object to be detected.

The present application provides another manner to identify the material information in the object to be detected. Specifically, it is possible to form a two-dimensional V value image of the object to be detected by using the X-ray transmission data and neutron transmission data obtained above. The V value at each pixel point in the V value image (namely each detected point in the object to be detected) is defined as:

$$V = \ln(I_n/I_{n0})/\ln(I_x/I_{x0})$$

wherein, $I_{n0}$ represents the density of the incident neutron beam; $I_n$ represents the density of the transmission neutron beam; $I_{x0}$ represents the density of the incident X-ray beam; and $I_x$ represents the density of the transmission X-ray beam. The V value at each pixel is associated with the kind of the material at the pixel. In this way, after obtaining the V value image of the object to be detected, it is possible to determine the high atomic number region therein. The V value image can realize more sensitive detection of the specific materials in the object to be detected.

Materials having high atomic number usually also have high density.

In other embodiments, it is also possible to determine the suspicious region in the object to be detected in other manners. For example, it is possible to carry out X-ray transmission detection on the object to be detected by using two X-ray beams in two perpendicular directions so as to determine the high density region therein.

Preferably, in determining the suspicious region, the X-ray beam and/or photoneutron beam produced by bombarding the photoneutron target with X-ray beams are used. It is advantageous to use the same X-ray source (for example composed of an electron accelerator and an electronic target) as that used in the process as will be described hereinafter so as to reduce the complexity and cost of the system.

If no high density and/or high atomic number region is found in the object to be detected in this process, the whole detection process can be ended and it is believed that no special nuclear materials exist in the object to be detected.

2) Detecting Fissile Materials in the Suspicious Region

After a suspicious region is found, the photoneutron conversion target 4 is moved to its non-working position. The object 7 to be detected is moved by a driving system, such that the suspicious region is placed on the detection position.

The electron accelerator is adjusted, such that it emits an electron beam 1 (referred to as first electron beam in the claims) of first energy. The electron beam 1 bombards the electron target 2 to produce an X-ray beam 3 (referred to as first X-ray beam in the claims). The energy of the X-ray beam 3 should enable the special nuclear materials that possibly exist in the object 7 to be detected to undergo a photofission. Therefore, the first energy of the electron beam 1 is better to be not lower than 6.5 MeV, for example between 6.5 MeV and 15 MeV. In one embodiment, the first energy can be selected as 9 MeV.

It needs to note that the third energy of the electron beam 1 used in the aforesaid detection of the suspicious region can be the same as the first energy so as to reduce the requirement on the electron accelerator. Of course, the third energy can also be different from the first energy and can be produced by a different electron accelerator.

The first X-ray beam 3 is collimated into an X-ray beam 9 by the collimator 6. The X-ray beam 9 is used to irradiate the suspicious region. If fissile materials exist in the suspicious region of the object 7 to be detected, they will undergo photofission under irradiation of the X first X-ray beam 3. The outcome of the photofission includes prompt γ-rays and neutron rays and delayed γ-rays and neutron rays (so-called β delay rays).

Since the electron beam 1 is usually electron beam impulse, the X-ray beam 4 is usually a series of X-ray pulses. In this way, it is possible to use X/γ ray detector 10 and neutron detector 13 respectively to measure the prompt r-ray and neutron ray signals emitted from the object 7 to be detected in the impulse interval between adjacent X-ray impulses. If the measured densities of γ-rays and neutron rays exceed their environmental background levels, it proves that the suspicious region of the object 7 to be detected contains fissile materials.

Preferably, X/γ ray detector 10 and neutron detector 13 are further used to measure β delay rays after stopping the irradiation of the X-ray beam 3. If the measured β delay rays exceed the environmental background level, it further confirms that the object to be detected surely contains fissile materials.

In some other embodiments, it also possible to only measure the prompt rays or the delay rays. In other embodiments, it is also possible to only measure the γ-rays or the neutron rays. In yet other embodiments, as long as one kind of measurement values of the γ-rays and neutron rays exceeds its environmental background level, it proves that the suspicious region of the object 7 to be detected contains fissile materials.

If no fissile materials are found in the suspicious region in this step, the whole detection process can be ended and it is believed that no special nuclear materials exist in the object to be detected.

3) Detecting the Special Nuclear Materials

After existence of fissile materials is found, the photoneutron conversion target 4 is moved back to its working position. The electron accelerator is adjusted, such that it emits an electron beam 1 (referred to as second electron beam in the claims) of second energy. It is appreciated that additional accelerators can also be used to produce the electron beam 1 of second energy in other embodiments.

The second electron beam 1 bombards the electronic target 2 to produce an X-ray beam 3 (referred to as second X-ray beam in the claims). The second X-ray beam 3 bombards the photoneutron conversion target 4 to produce photoneutrons. The photoneutrons are low energy neutrons and the energy thereof is selected to enable the special nuclear materials that possibly exist in the fissile materials in the object to be detected to undergo a thermal neutron induced fission. Therefore, the second energy of the electron beam 1 is preferably between 2 MeV and 6 MeV, more preferably between 3 MeV and 5 MeV. In one embodiment, the second energy can be selected as 4 MeV. The second energy is usually smaller than the first energy stated above. As far as the electron beam 1 having the selected second energy is concerned, the energy of the second X-ray beam 3 produced thereby will not cause the fissile materials in the object 7 to be detected to undergo a photofission, and therefore will no interference with the following detection process about the thermal neutron induced fission.

The produced low energy neutrons produced are used to irradiate the suspicious region of the object to be detected for a time. The low energy neutrons enter the suspicious region after moderated. If the object 7 to be detected contains special nuclear materials, the low energy neutrons that enter the suspicious region cause it to undergo a thermal neutron induced fission, thereby emitting γ-rays and neutron rays.

After stopping irradiation of the second X-ray beam 3 or low energy neutrons, the X/γ ray detector 10 and the neutron detector 13 are used to measure the γ-rays and neutron rays emitted due to the thermal neutron induced fission. If the measured neutron rays and γ-rays exceed the environmental background levels, it is possible to judge that the suspicious region contains special nuclear materials, namely uranium 235 and plutonium 239.

Although the foregoing embodiments include the step of detecting the suspicious region, those skilled in the art can understand that the step can also be omitted and that the whole object to be detected is taken as a detection region for detection of the fissile materials therein in some other embodiments. In this occasion, it is possible to use the first X-ray beam 3 to scan the whole object 7 to be detected, thereby determining the position of the fissile materials that possibly exist.

Although this invention has been described in connection with particular embodiments thereof, it should be noted that these embodiments are only illustrative, rather than limiting. Those skilled in the art can make alterations or variations to these embodiments within the range of protection defined by the appended claims.

The invention claimed is:

1. A method for detecting special nuclear materials, comprising the steps of
generating a first electron beam by an electron accelerator, the first electron beam having a first energy;
producing a first X-ray beam using the first electron beam;
irradiating a detection region of an object to be detected with the first X-ray beam, the energy of the first X-ray beam being selected to enable the special nuclear materials that possibly exist in the object to be detected to undergo an observable photofission;

measuring a first fission ray signal emitted from the object to be detected due to the photofission, wherein if the measured first fission ray signal exceeds a first threshold value, it is determined that the detection region of the object to be detected contains fissile materials;

generating a second electron beam by the electron accelerator if it is determined that the detection region of the object to be detected contains fissile materials, the second electron beam having a second energy different than the first energy;

producing a second X-ray beam by bombarding an electronic target with the second electron beam, wherein the energy of the second X-ray beam is lower than the energy of the first X-ray beam and the second X-ray beam is used to generate low energy neutrons;

irradiating the detection region of the object to be detected with the low energy neutrons, the energy of the low energy neutrons being selected to enable the special nuclear materials that possibly exist in the fissile materials in the object to be detected to undergo a thermal neutron induced fission;

measuring a second fission ray signal emitted from the object to be detected due to the thermal neutron induced fission, wherein if the measured second fission ray signal exceeds a second threshold value, it is determined that the fissile materials in the object to be detected contain special nuclear materials.

2. The method according to claim 1, wherein the first fission ray signal includes:
a prompt fission ray signal and/or delay fission ray signal emitted from the object to be detected.

3. The method according to claim 2, wherein the first X-ray beam includes a series of X-ray impulses, and measuring of the prompt fission ray signal is carried out in the impulse interval between adjacent impulses of the first X-ray beam.

4. The method according to claim 2, wherein measuring of the delay fission ray signal is carried out after stopping the first X-ray beam.

5. The method according to claim 2, wherein measuring of the first fission ray signal includes not only measuring of the prompt fission ray signal but also measuring of the delay fission ray signal so as to carry out double confirmations of the existence of the fissile materials.

6. The method according to claim 1, wherein the energy of the second X-ray beam is selected to be lower than the energy that enables the fissile materials to undergo an observable photofission.

7. The method according to claim 1, wherein measuring of the second fission ray signal is carried out after stopping the second X-ray beam.

8. The method according to claim 1, wherein the first and second X-ray beams are respectively produced by bombarding the electronic target with first and second electron beams having different energies, and the energy of the first electron beam is higher than that of the second electron beam.

9. The method according to claim 1, wherein the first and second fission ray signals include γ-ray and/or neutron ray signals respectively.

10. The method according to claim 9, wherein the first and/or second threshold values are selected as the environmental backgrounds of the γ-rays and/or neutron rays.

11. The method according to claim 1, further comprising the steps of:
detecting the suspicious region of the object to be detected; and
taking the suspicious region as a detection region prior to irradiating with the first X-ray beam, the suspicious region including a high density and/or high atomic number region in the object to be detected.

12. The method according to claim 11, wherein the detecting of the high atomic number region includes:
carrying out X-ray transmission detection and neutron transmission detection on the object to be detected and determining the high atomic number region in the object to be detected with the obtained X-ray transmission data and neutron transmission data.

13. The method according to claim 12, wherein the X-ray transmission detection uses a continuous energy spectrum X-ray beam; the neutron transmission detection uses a continuous energy spectrum neutron beam; and the X-ray transmission data and the neutron transmission data are used to form a V value image of the object to be detected, wherein the V value at each pixel in the V value image of the object to be detected is defined as:

$$V = \ln(In/In0)/\ln(Ix/Ix0)$$

wherein, In0 represents the intensity of the incident neutron beam; In represents the intensity of the transmission neutron beam; Ix0 represents the intensity of the incident X-ray beam; and Ix represents the intensity of the transmission X-ray beam, wherein the V value at each pixel is associated with the kind of the materials at the pixel.

14. The method according to claim 13, wherein the continuous energy spectrum X-ray beam is formed by a part of a third X-ray beam, and the continuous energy spectrum neutron beam is formed by bombarding a photoneutron conversion target with another part of the third X-ray beam.

15. The method according to claim 14, wherein the third X-ray beam and the first X-ray beam are respectively produced by bombarding an electronic target with the third and the first electron beams.

16. The method according to claim 15, wherein the third and first electron beams have the same energy.

17. The method according to claim 15, wherein the third and second electron beams are produced by the same electron accelerator.

18. The method according to claim 8, wherein the amount of energy of the first electron beam is selected to be not lower than 6.5 MeV and the amount of energy of the second electron beam is preferably between 2 MeV and 6 MeV.

19. The method according to claim 18, wherein the amount of energy of the first electron beam is selected to be between 6.5 MeV and 15 MeV and the amount of energy of the second electron beam is more preferably between 3 MeV and 5 MeV.

* * * * *